United States Patent
Sreejith et al.

(10) Patent No.: US 7,239,608 B2
(45) Date of Patent: Jul. 3, 2007

(54) ROUTER USING MEASUREMENT-BASED ADAPTABLE LOAD TRAFFIC BALANCING SYSTEM AND METHOD OF OPERATION

(75) Inventors: Sreedharan Sreejith, Murphy, TX (US); Jack C. Wybenga, Plano, TX (US)

(73) Assignee: Samsung Electronics Co., Ltd., Suwon (KR)

(*) Notice: Subject to any disclaimer, the term of this patent is extended or adjusted under 35 U.S.C. 154(b) by 903 days.

(21) Appl. No.: 10/133,712

(22) Filed: Apr. 26, 2002

(65) Prior Publication Data

US 2003/0202511 A1    Oct. 30, 2003

(51) Int. Cl.
*H04L 12/56* (2006.01)
(52) U.S. Cl. .................................. 370/230
(58) Field of Classification Search ............ 370/229, 370/230, 386, 389, 400, 401
See application file for complete search history.

(56) References Cited

U.S. PATENT DOCUMENTS 6,728,770 B1 *   4/2004   Bradford et al. ............ 709/226

* cited by examiner

*Primary Examiner*—Derrick W. Ferris

(57) ABSTRACT

In a distributed router containing routing nodes connected by a switch fabric, an input-output processor for use in the routing nodes. The input-out processor comprises: 1) an input interface controller for receiving incoming data packets from N input links; 2) an output interface controller for transmitting outgoing data packets to the switch fabric via a first uplink and a second uplink. Each of the N input links is assigned to one of the first and second uplinks so that incoming data packets from each input link are transmitted to the switch fabric by the assigned one of the first and second uplinks. The input-out processor also comprises 3) a load balancing controller for i) determining first and second uplink traffic levels on the first and second uplinks, ii) determining a difference between the first and second uplink traffic levels, iii) comparing the difference to a predetermined threshold, and, iv) in response to a determination that the difference exceeds the predetermined threshold, reassigning at least one input link from the uplink having the greater uplink traffic level to the uplink having the lesser uplink traffic level.

16 Claims, 4 Drawing Sheets

ROUTER USING MEASUREMENT-BASED ADAPTABLE LOAD TRAFFIC BALANCING SYSTEM AND METHOD OF OPERATION

CROSS-REFERENCE TO RELATED APPLICATIONS

The present invention is related to those disclosed in the following U.S. Patent Applications:
1) Provisional Patent Application Ser. No. 60/327,494, filed Oct. 5, 2001, entitled "A COORDINATION PROTOCOL FOR LOOSELY COUPLED MASSIVELY PARALLEL ROUTER";
2) Provisional Patent Application Ser. No. 60/327,230, filed Oct. 5, 2001, entitled "REDUNDANCY MECHANIZATION PROTOCOL FOR A MULTI-GIGABIT SWITCHING ROUTER";
3) Patent application Ser. No. 10/193,426, filed on Jul. 11, 2002, entitled "COORDINATION PROTOCOL FOR A MASSIVELY PARALLEL ROUTER ARCHITECTURE"; and
4) Patent application Ser. No. 10/193,355, filed concurrently herewith, entitled "REDUNDANCY MECHANIZATION PROTOCOL FOR A MULTI-GIGABIT ROUTER".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to massively parallel routers and, more specifically, to a measurement-based adaptable load traffic balancing apparatus for use in a massively parallel router.

BACKGROUND OF THE INVENTION

The explosive growth of Internet traffic has been caused by the increased number of Internet users, various service demands from those users, the implementation of new services, such as voice-over-IP (VoIP) or streaming applications, and the development of mobile Internet. Conventional routers, which act as relaying nodes connected to subnetworks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers. Thus, routers are increasingly blamed for major bottlenecks in the Internet.

Early routers were implemented on a computer host so that the CPU of the host performed all managerial tasks, such as packet forwarding via a shared bus and routing table computation. This plain architecture proved to be inefficient, due to the concentrated overhead of the CPU and the existence of congestion on the bus. As a result, router vendors developed distributed router architectures that provide efficient packet processing compared to a centralized architecture. In a distributed router architecture, many of the functions previously performed by the centralized CPU are distributed to the line cards and the shared bus is replaced by a high-speed crossbar switch.

FIG. 1 illustrates distributed router 100 according to an exemplary embodiment of the prior art. Distributed router 100 interfaces with different types of networks, including optical networks (OC-192), asynchronous transfer mode (ATM) networks, and Gigabit Ethernet, among others. Distributed router 100 comprises line card modules (LCMS) 111–113, switch fabric 130, routing processor 140, and line card modules (LCMS) 151–153. LCM 111, LCM 112, and LCM 113 contain forwarding table (FT) 121, forwarding table (FT) 122, and forwarding table (FT) 123, respectively. Similarly, LCM 151, LCM 152, and LCM 153 contain forwarding table (FT) 161, forwarding table (FT) 162, and forwarding table (FT) 163, respectively.

Packets coming from adjacent router(s) or subnetworks are received by line card modules 111–113 and line card modules 151–153 and sent to switch fabric 140. Switch fabric 130 switches packets coming from or going to line card modules 111–113 and 151–153 and plays an essential role in relaying packets.

Routing processor 140 builds routing table 141 and maintains the current status of routing table 141 by updating changed routes immediately. Routing processor 140 maintains routing table 141 by running a routing protocol, such as Routing Information Protocol (RIP), Open Shortest Path First (OSPF), or Border Gateway Protocol (BGP). Forwarding tables 121–123 and 161–163 support an efficient lookup in each line card and are downloaded from routing table 141 of routing processor 140. If an incoming packet from a line card module cannot find its destination path from the forwarding table, the corresponding packet may be passed through switch fabric 130 toward a pre-defined default route, or may be silently discarded at the line card.

The main reason for router manufacturers to favor distributed architecture is the simplicity of using a centralized processor to manage one routing table in a consistent way. On the other hand, although the separation of routing and forwarding functions enables high-speed packet processing, the introduction of QoS-capable routing service and the route delays caused by network instability demand even greater packet processing capacity, thereby resulting in additional overhead for the routing processor or instability in the router itself.

A large number of small routers can operate in concert (i.e., in parallel), if an efficient set of interoperability rules are established. The industry has avoided this coordination problem by using a single routing server to handle the routing problems. Therefore, it bounds both the scale of the router and its maximum performance to the scale of available microprocessor processing capacity.

Data packets that are inbound to a router may be switched through to one or more switch fabrics via two or more uplink paths within the input interface. The purpose of having multiple uplinks and switch fabric modules is to perform traffic load balancing and to provide redundant paths in case of link or switch fabric module failures. For example, packets received by LCM 111 in FIG. 1 may be transmitted to switch fabric 130 via one of N uplink paths. The actual uplink path may be selected by forwarding table 121. The selected path may be chosen, for example, by a round robin load balancing scheme in which the uplinks are sequentially selected for successive packets. However, by its very nature, such as scheme may potentially alter the order in which packets from the same source are received at the output interface (e.g., LCM 151–LCM 153). This may lead to performance and conformance related problems. Even though Internet protocol (IP) does not assume any packet ordering, packets arriving out-of-order at the destination may create throughput problems, particularly for TCP/IP based applications. The problem is worsened if packet size is not taken into consideration, since packet size deviation can affect the effectiveness of the load balancing scheme.

Therefore, there is a need in the art for an improved massively parallel router. In particular, there is a need for a massively parallel router having a distributed architecture that implements an effective load balancing scheme. More particularly, there is a need for a distributed architecture router that implements a load balancing scheme that minimizes out-of-order packet arrival and that minimizes the impact of packet size deviation.

SUMMARY OF THE INVENTION

The present invention implements a measurement based approach to load balancing at the input interfaces of a router. A traffic monitoring controller uses routing tables to perform load balancing. Packet streams are classified according to some criteria, such as the incoming interfaces, destination IP address, port numbers, and the like. The route lookup table acts as an implicit classifier. A load balancing controller allocates uplink paths to the switching fabric for each packet flow. The load balancing controller periodically re-evaluates uplink paths based on measured traffic and reassigns the uplink paths to perform optimal load balancing.

To address the above-discussed deficiencies of the prior art, it is a primary object of the present invention to provide, in a distributed router comprising a plurality of routing nodes interconnected by a switch fabric, an input-output processor for use in one of the plurality of routing nodes. According to an advantageous embodiment of the present invention, the input-out processor comprises: 1) an input interface controller capable of receiving incoming data packets from N input links; 2) an output interface controller capable of transmitting outgoing data packets to the switch fabric via a first uplink and a second uplink, wherein each of the N input links is assigned to one of the first and second uplinks so that incoming data packets from the each input link are transmitted to the switch fabric by the assigned one of the first and second uplinks; and 3) a load balancing controller capable of determining a first uplink traffic level on the first uplink and a second uplink traffic level on the second uplink, determining a difference between the first and second uplink traffic levels, comparing the difference to a predetermined threshold, and, in response to a determination that the difference exceeds the predetermined threshold, reassigning at least one of the N input links from the one of the first and second uplinks having a greater uplink traffic level to the one of the first and second uplinks having a lesser uplink traffic level.

According to one embodiment of the present invention, the load balancing controller determines the first uplink traffic level and the second uplink traffic level after periodic intervals.

According to another embodiment of the present invention, the load balancing controller determines the first uplink traffic level and the second uplink traffic level in response to an external control signal.

According to still another embodiment of the present invention, the load balancing controller is further capable of determining input traffic levels on each of the N input links and reassigns the at least one of the N input links according to input traffic levels on the at least one of the N input links.

According to yet another embodiment of the present invention, the load balancing controller reassigns a minimum number of the at least one of the N input links having an aggregate input traffic level sufficient to cause the first uplink traffic level and the second uplink traffic level to be approximately equal after reassignment of the minimum number of the at least one of the N input links.

According to a further embodiment of the present invention, the output interface comprises a packet scheduler capable of scheduling transmission of the outgoing data packets on the first and second uplinks.

According to a still further embodiment of the present invention, the input-output processor further comprises an uplink load statistics table associated with the packet scheduler capable of storing the first uplink traffic level and the second uplink traffic level.

According to a yet further embodiment of the present invention, the input-output processor further comprises a load balancing table associated with the packet scheduler capable of storing assignment data indicating which of the N input links are assigned to the first uplink and which of the N input links are assigned to the second uplink, wherein the load balancing controller is capable of modifying the assignment data.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
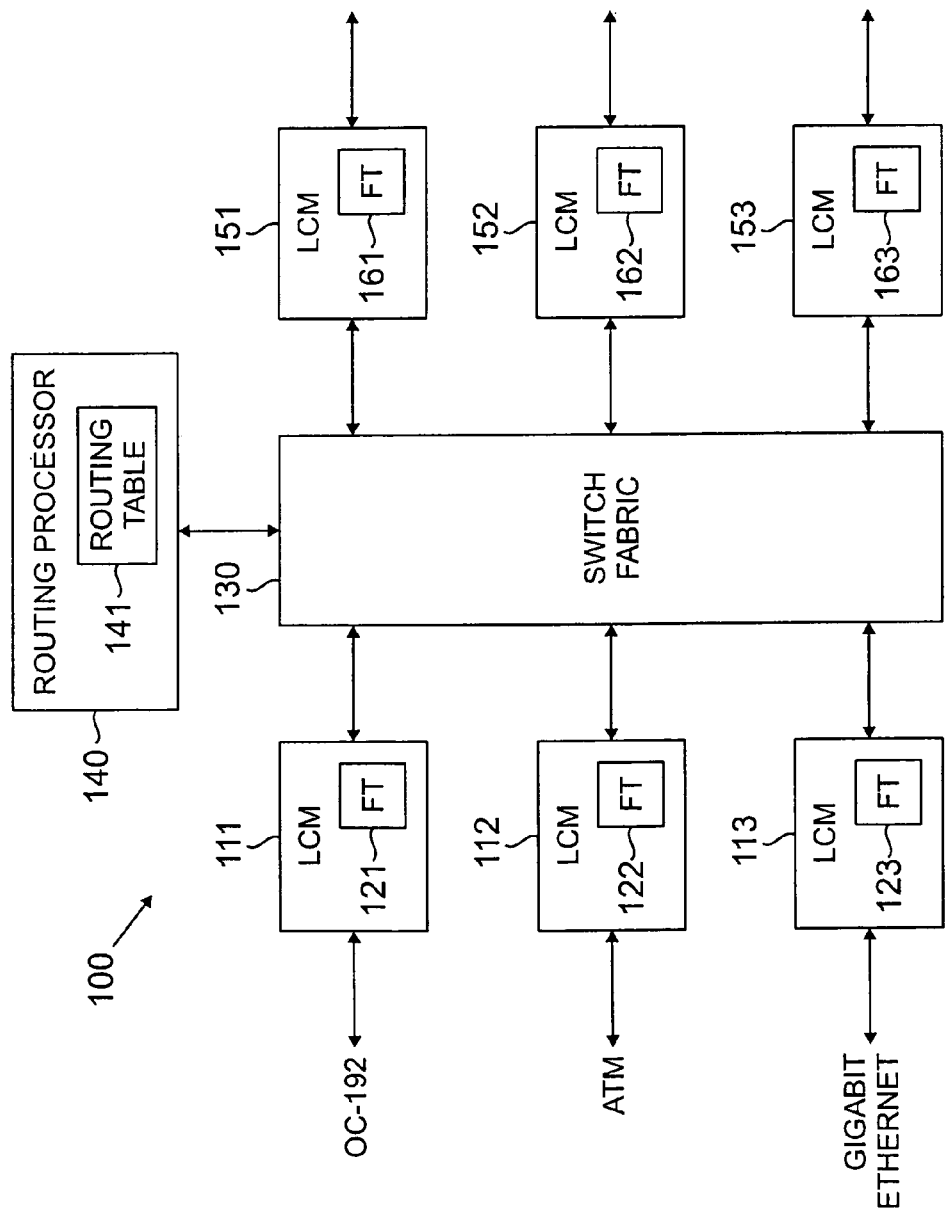
FIG. 1 illustrates a distributed router architecture according to an exemplary embodiment of the prior art.
Figure 2:
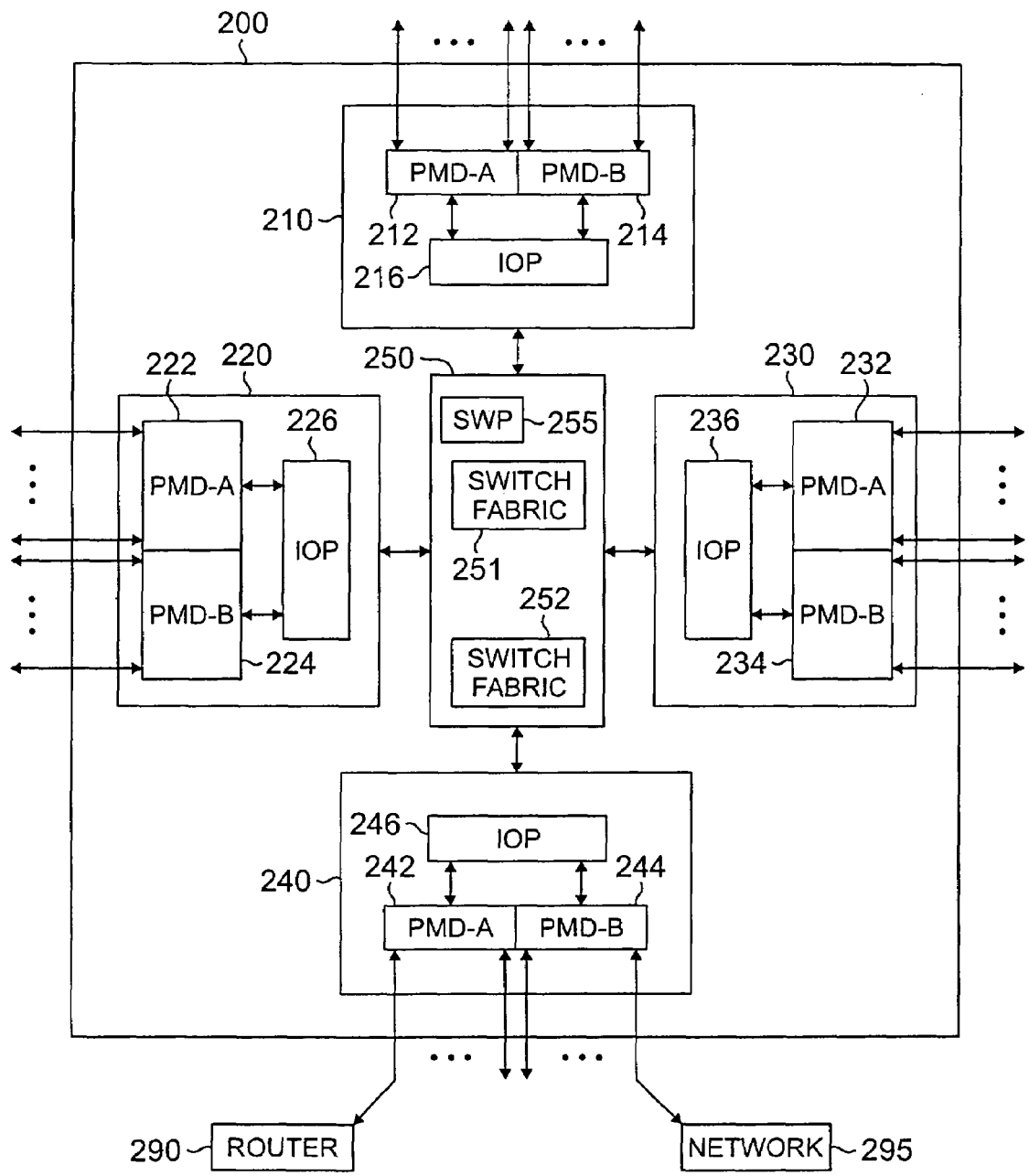
FIG. 2 illustrates a distributed router architecture using Far optimal load balancing techniques according to one embodiment of the present invention.
Figure 3:
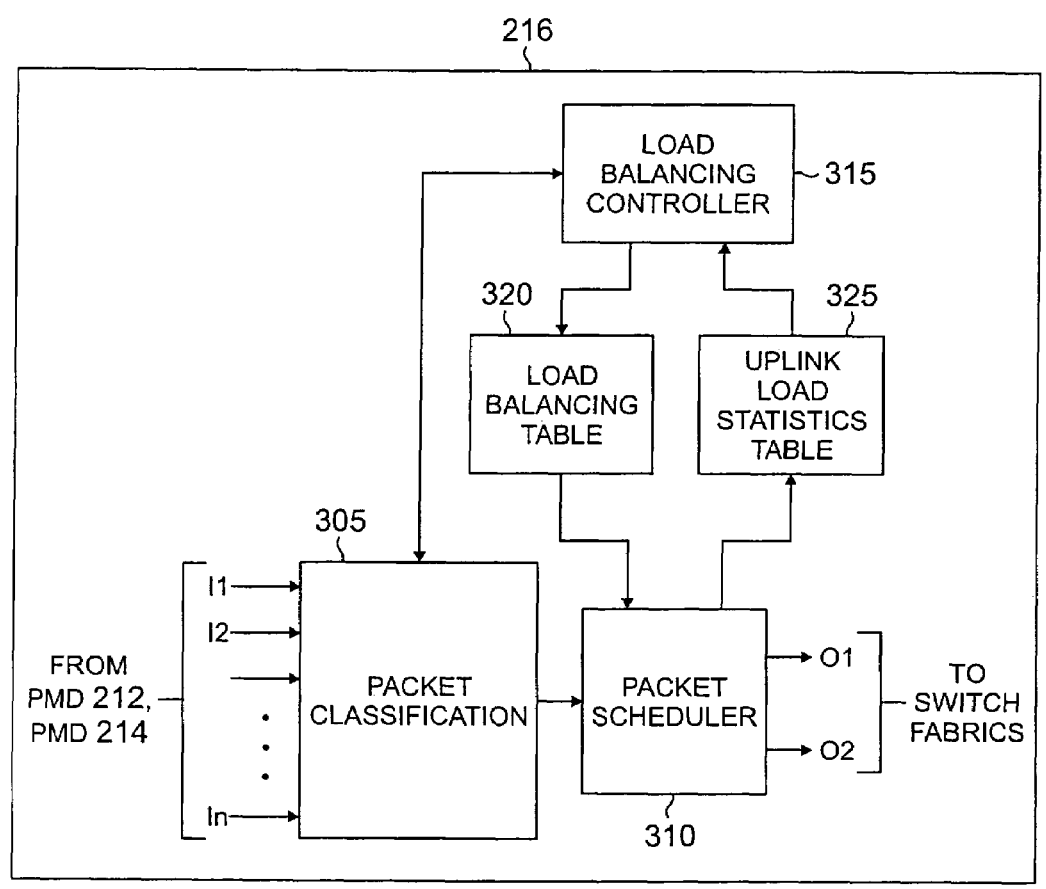
FIG. 3 illustrates an exemplary input-output processor (IOP) according to one embodiment of the present invention.
Figure 4:
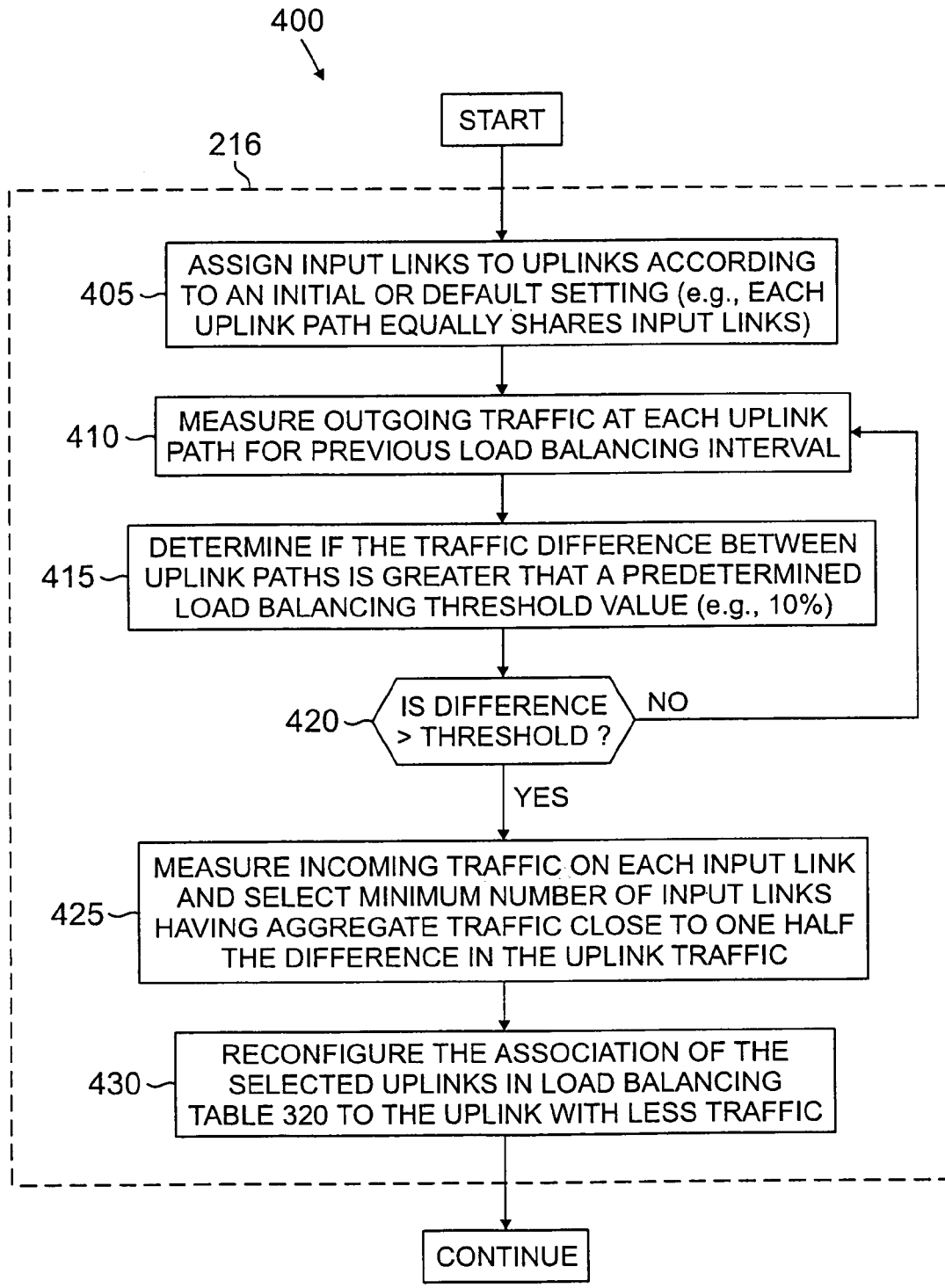
FIG. 4 is a flow diagram illustrating the load balancing operations of the exemplary input-output processor according to one embodiment of the present invention.

FIGS. 2 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged distributed router.

FIG. 2 illustrates distributed router architecture 200, which uses optimal load balancing techniques according to one embodiment of the present invention. Distributed router architecture 200 provides scalability and high-performance using up to N independent routing nodes (RN), including exemplary routing nodes 210, 220, 230 and 240, connected by high-speed interconnecting switch 250. Each routing node comprises an input-output processor (IOP), and one or more physical medium devices (PMDs). Exemplary RN 210 comprises PMD 212 (labeled PMD-A), PMD 214 (labeled PMD-B), and IOP 216. RN 220 comprises PMD 222 (labeled PMD-A), PMD 224 (labeled PMD-B), and IOP 226. RN 230 comprises PMD 232 (labeled PMD-A), PMD 234 (labeled PMD-B), and IOP 236. Finally, exemplary RN 240 comprises PMD 242 (labeled PMD-A), PMD 244 (labeled PMD-B), and IOP 246.

Each one of IOP 216, IOP 226, IOP 236, and IOP 246 buffers incoming Internet protocol (IP) packets from subnets or adjacent routers, such as router 290 and network 295. Each one of IOP 216, IOP 226, IOP 236, and IOP 246 also classifies requested services, looks up destination addresses from packet headers, and forwards packet to the outbound IOP. Moreover, each IOP also maintains an internal routing table determined from routing protocol packets and computes the shortest data paths from the routing table. Each IOP processes an incoming packet from one of its PMD modules. According to one embodiment of the present invention, each PMD card frames an incoming packet (or cell) from an IP network (or ATM switch) to be processed in an IOP and performs bus conversion functions.

Each one of routing nodes 210, 220, 230, and 240, configured with an IOP and PMD(s) and linked by one or more switch fabrics 251 and 252 in interconnecting switch 250, is essentially equivalent to a router by itself. The present invention proposes a generic and scalable router architecture comprised of multiple RNs connected by high-speed interconnecting switch 250. Thus, distributed router architecture 200 can be considered a set of RN building blocks with high-speed links connected to each block.

Interconnecting switch 250 may comprise multiple switch fabrics, including exemplary switch fabrics 251 and 252. The multiple switch fabrics receive packets from IOPs on the multiple uplinks and transfer the received packets to destination IOPs. Switch processor (SWP) 255 located in interconnecting switch 250 supports system management as well as packet switching between IOPs. Distributed router architecture 200 can be constructed by using available off-the-shelf commodities on the market, thereby resulting in cost competitiveness, flexibility, resiliency, and scalability by attaching each building block to the switch fabric.

FIG. 3 illustrates exemplary input-output processor (IOP) 216 of routing node 210 according to one embodiment of the present invention. Input-output processor 216 comprises packet classification controller 305, packet scheduler 310, load balancing controller 315, load balancing table 320, and uplink load statistics table 325. Input-output processor 216 receives incoming data packets from PMD 212 and PMD 214 on N input channels, including exemplary input channels I1, I2, and In, and sends the received data packets to packet classification controller 305. Packet classification controller 305 examines the IP address of the received packets and determines which data packets must be sent to switch fabric 130 and which data packets may be sent back out via PMD 212 and PMD 214.

Packet classification controller 305 transfers to packet scheduler 310 all data packets that are to be sent to the multiple switch fabrics (e.g., switch fabrics 251 and 252) in interconnecting switch 250 for subsequent transfer to one of routing nodes 220, 230 and 240. Packet scheduler 310 transmits all data packets to switch fabric 130 via one of two uplink paths, O1 and O2. In alternate embodiments of the present invention, more than two uplinks paths may be implemented. The uplink path selected by packet scheduler 310 is determined by the routing table information stored in load balancing table 320. According to the principles of the present invention, data packet load statistics for the O1 uplink path and the O2 uplink path are measured (or read) in packet scheduler 310 and stored in uplink load statistics table 325. According to the principles of the present invention, load balancing controller 315 uses the measured (read) load statistics stored in uplink load statistics table 325 to modify the routing table information stored in load balancing table 320 in order to effect load balancing between the O1 uplink path and the O2 uplink path.

FIG. 4 depicts flow diagram 400, which illustrates the load balancing operations of exemplary input-output processor (IOP) 216 according to one embodiment of the present invention. Initially, load balancing controller 315 assigns input links to uplink paths O1 and O2 according to an initial or default setting (e.g., each uplink path equally shares input links) (process step 405). During the ordinary course of operation, load balancing controller 315 measures the outgoing traffic at each uplink path for the previous load balancing interval (process step 410). The load balancing interval may be a modifiable periodic interval (e.g., once every 10 seconds, 20 seconds, or 30 seconds) or may be determined by an external triggering event, such as receipt of a control signal from switch fabric 130.

Next, load balancing controller 315 determines if the traffic difference between uplink paths is greater that a predetermined load balancing threshold value (e.g., 10%) (process step 415). Load balancing controller 315 makes this determination based on the uplink load statistics stored in uplink load statistics table 325. If the difference does not exceed the threshold, load balancing controller 315 continues to measure the outgoing traffic at each uplink (process steps 420 and 410). If the difference does exceed the threshold value, load balancing controller 315 measures the incoming traffic on each input link and selects the minimum number of input links having an aggregate traffic flow close to one half the difference in the uplink traffic on uplink paths O1 and O2 (process steps 420 and 425). Load balancing controller 315 may measure the input link traffic directly from packet classification controller 305 or may determine the input link traffic indirectly using input link information received by packet scheduler 310 and stored in uplink load statistics table 325. Finally, load balancing controller 315 reconfigures the association of the selected uplinks in load balancing table 320 to the uplink path having less traffic (process step 430). Some data packet reordering may be necessary at the destination during a small window of time after the uplink re-association (or reconfiguration) is done. However, only a very small number of packets will need to be re-ordered.

In alternate embodiments of the present invention containing more than two uplinks paths, load balancing controller 315 determines the average uplink traffic level on the M uplinks paths and then determines for each uplink the difference between the average uplink traffic level and the actual uplink traffic level for that uplink path. For each uplink that is below the average uplink traffic level, load balancing controller 315 reallocates one or more input links that are currently assigned to one or more uplink paths that are above the average uplink traffic level so as to bring each uplink path as close to the average uplink traffic level as is reasonably practical.

Although the present invention has been described in detail, those skilled in the art should understand that they may make various changes, substitutions and alterations herein without departing from the spirit and scope of the invention in its broadest form.

What is claimed is:

1. In a distributed router comprising a plurality of routing nodes interconnected by a switch fabric, an input-output processor for use in one of said plurality of routing nodes comprising:
    an input interface controller capable of receiving incoming data packets from N input links;
    an output interface controller capable of transmitting outgoing data packets to said switch fabric via a first uplink and a second uplink, wherein each of said N input links is assigned to one of said first and second uplinks so that incoming data packets from said each input link are transmitted to said switch fabric by said assigned one of said first and second uplinks; and
    a load balancing controller capable of determining a first uplink traffic level on said first uplink and a second uplink traffic level on said second uplink, determining a difference between said first and second uplink traffic levels, comparing said difference to a predetermined threshold, and, in response to a determination that said difference exceeds said predetermined threshold, reassigning at least one of said N input links from the one of said first and second uplinks having a greater uplink traffic level to the one of said first and second uplinks having a lesser uplink traffic level.

2. The input-output processor as set forth in claim 1 wherein said load balancing controller determines said first uplink traffic level and said second uplink traffic level after periodic intervals.

3. The input-output processor as set forth in claim 1 wherein said load balancing controller determines said first uplink traffic level and said second uplink traffic level in response to an external control signal.

4. The input-output processor as set forth in claim 1 wherein said load balancing controller is further capable of determining input traffic levels on each of said N input links and reassigns said at least one of said N input links according to input traffic levels on said at least one of said N input links.

5. The input-output processor as set forth in claim 4 wherein said load balancing controller reassigns a minimum number of said at least one of said N input links having an aggregate input traffic level sufficient to cause said first uplink traffic level and said second uplink traffic level to be approximately equal after reassignment of said minimum number of said at least one of said N input links.

6. The input-output processor as set forth in claim 5 wherein said output interface comprises a packet scheduler capable of scheduling transmission of said outgoing data packets on said first and second uplinks.

7. The input-output processor as set forth in claim 6 further comprising an uplink load statistics table associated with said packet scheduler capable of storing said first uplink traffic level and said second uplink traffic level.

8. The input-output processor as set forth in claim 7 further comprising a load balancing table associated with said packet scheduler capable of storing assignment data indicating which of said N input links are assigned to said first uplink and which of said N input links are assigned to said second uplink, wherein said load balancing controller is capable of modifying said assignment data.

9. A distributed router capable of routing data packets between telecommunication devices coupled to said distributed router, said distributed router comprising:
    a plurality of routing nodes, each of said plurality of routing nodes capable of receiving data packets from and transmitting data packets to said telecommunication devices; and
    a switch fabric capable of transmitting said data packets between said plurality of routing nodes, wherein each of said plurality of routing nodes comprises an input-output processor comprising:
        an input interface controller capable of receiving incoming data packets from N input links;
        an output interface controller capable of transmitting outgoing data packets to said switch fabric via a first uplink and a second uplink, wherein each of said N input links is assigned to one of said first and second up links so that incoming data packets from said each input link are transmitted to said switch fabric by said assigned one of said first and second uplinks; and
        a load balancing controller capable of determining a first uplink traffic level on said first uplink and a second uplink traffic level on said second uplink, determining a difference between said first and second uplink traffic levels, comparing said difference to a predetermined threshold, and, in response to a determination that said difference exceeds said predetermined threshold, reassigning at least one of said N input links from the one of said first and second uplinks having a greater uplink traffic level to the one of said first and second uplinks having a lesser uplink traffic level.

10. The distributed router as set forth in claim 9 wherein said load balancing controller determines said first uplink traffic level and said second uplink traffic level after periodic intervals.

11. The distributed router as set forth in claim 10 wherein said load balancing controller determines said first uplink traffic level and said second uplink traffic level in response to an external control signal.

12. The distributed router as set forth in claim 9 wherein said load balancing controller is further capable of determining input traffic levels on each of said N input links and reassigns said at least one of said N input links according to input traffic levels on said at least one of said N input links.

13. The distributed router as set forth in claim 12 wherein said load balancing controller reassigns a minimum number of said at least one of said N input links having an aggregate input traffic level sufficient to cause said first uplink traffic level and said second uplink traffic level to be approximately equal after reassignment of said minimum number of said at least one of said N input links.

14. The distributed router as set forth in claim 13 wherein said output interface comprises a packet scheduler capable of scheduling transmission of said outgoing data packets on said first and second uplinks.

15. The distributed router as set forth in claim 14 further comprising an uplink Load statistics table associated with said packet scheduler capable of storing said first uplink traffic level and said second uplink traffic level.

16. The distributed router as set forth in claim 15 further comprising a load balancing table associated with said packet scheduler capable of storing assignment data indicating which of said N input links are assigned to said first uplink and which of said N input links are assigned to said second uplink, wherein said load balancing controller is capable of modifying said assignment data.

* * * * *